United States Patent
Gabbai

(10) Patent No.: US 10,147,128 B2
(45) Date of Patent: Dec. 4, 2018

(54) CROSS SELLING PLATFORM

(71) Applicant: eBay Inc., San Jose, CA (US)

(72) Inventor: Jonathan Gabbai, London (GB)

(73) Assignee: eBay Inc., San Jose, CA (US)

( * ) Notice: Subject to any disclaimer, the term of this patent is extended or adjusted under 35 U.S.C. 154(b) by 965 days.

(21) Appl. No.: 14/192,770

(22) Filed: Feb. 27, 2014

(65) Prior Publication Data

US 2015/0242928 A1    Aug. 27, 2015

(51) Int. Cl.
*G06G 1/12*     (2006.01)
*G06Q 20/00*    (2012.01)
*G06Q 30/06*    (2012.01)

(52) U.S. Cl.
CPC ..... *G06Q 30/0631* (2013.01); *G06Q 30/0625* (2013.01)

(58) Field of Classification Search
CPC ........ G06Q 20/02; G06Q 20/20; G06Q 30/02; G06Q 30/06; G07G 1/14
USPC ......... 705/2, 14.26, 14.49, 26.62, 26.64, 21; 455/403, 414, 445
See application file for complete search history.

(56) References Cited

U.S. PATENT DOCUMENTS

| | | | | |
|---|---|---|---|---|
| 5,845,266 A * | 12/1998 | Lupien | ................... | G06Q 40/00 705/36 R |
| 6,598,026 B1 * | 7/2003 | Ojha | ................... | G06Q 30/0633 705/1.1 |
| 6,611,814 B1 * | 8/2003 | Lee | ................... | G06Q 30/02 705/26.1 |
| 7,117,166 B2 * | 10/2006 | Ifflander | ............ | G06Q 30/0258 705/27.1 |
| 7,305,364 B2 * | 12/2007 | Nabe | ................... | G06Q 10/06 705/37 |
| 7,376,613 B1 * | 5/2008 | Cofino | ................... | G06Q 20/10 705/26.3 |
| 7,389,294 B2 * | 6/2008 | Kotas | ................... | G06Q 10/087 705/28 |
| 7,392,221 B2 * | 6/2008 | Nabe | ................... | G06Q 20/105 235/379 |
| 7,464,862 B2 * | 12/2008 | Bacastow | ............. | G06Q 20/20 235/380 |
| 7,472,077 B2 * | 12/2008 | Roseman | ............... | G06Q 30/02 235/383 |
| 7,493,274 B2 * | 2/2009 | Bezos | ................... | G06Q 30/02 235/383 |
| 7,497,369 B2 * | 3/2009 | Dalzell | ................. | G06Q 30/02 235/375 |
| 7,577,582 B1 * | 8/2009 | Ojha | ................... | G06Q 30/06 705/26.3 |
| 7,805,330 B2 * | 9/2010 | Johnson | ............... | G06Q 10/087 705/14.26 |

(Continued)

*Primary Examiner* — Andrew Joseph Rudy
(74) *Attorney, Agent, or Firm* — Shook, Hardy & Bacon L.L.P.

(57) ABSTRACT

In various example embodiments, a system and method for a cross selling platform are presented. A request for a product listing triggered by a user may be received. The request for the product listing may include product information corresponding to an in-store product located at a store of a merchant. A related product listing may be identified based on the product information. Each product listing of the plurality of product listings may correspond to a merchant product. The product listing may be recommended to the user for sale.

21 Claims, 11 Drawing Sheets

(56) References Cited

U.S. PATENT DOCUMENTS

| | | | | |
|---|---|---|---|---|
| 7,979,457 B1* | 7/2011 | Garman | G06F 17/30864 | 705/26.8 |
| 7,979,462 B2* | 7/2011 | Chang | G06Q 30/0603 | 705/26.64 |
| 8,050,976 B2* | 11/2011 | Staib | G06Q 20/201 | 705/14.23 |
| 8,082,170 B2* | 12/2011 | Cereghini | G06Q 30/02 | 705/7.31 |
| 8,170,918 B2* | 5/2012 | Gomez | G06Q 30/00 | 705/26.1 |
| 8,204,884 B2* | 6/2012 | Freedman | G06Q 30/06 | 379/265.06 |
| 8,234,375 B2* | 7/2012 | Ghadialy | G06Q 30/02 | 705/14.49 |
| 8,260,692 B1* | 9/2012 | Miller | G06Q 10/087 | 235/379 |
| 8,301,125 B2* | 10/2012 | Ramer | H04H 60/46 | 455/414.1 |
| 8,312,036 B2* | 11/2012 | Chang | G06Q 30/02 | 707/758 |
| 8,332,232 B2* | 12/2012 | Nickerson | G06Q 30/02 | 705/1.1 |
| 8,370,155 B2* | 2/2013 | Byrd | G06Q 10/10 | 379/88.01 |
| 8,403,217 B2* | 3/2013 | Bennett | G06Q 30/0207 | 235/383 |
| 8,433,297 B2* | 4/2013 | Ramer | G06Q 30/02 | 455/414.1 |
| 8,639,440 B2* | 1/2014 | Nicholson | G01C 21/00 | 701/400 |
| 8,713,187 B2* | 4/2014 | Raboin | G06F 17/30861 | 340/5.52 |
| 8,819,659 B2* | 8/2014 | Ramer | G06F 17/30398 | 455/445 |
| 8,832,100 B2* | 9/2014 | Ramer | G06F 17/30867 | 707/734 |
| 8,966,383 B2* | 2/2015 | Gautier | H04W 8/265 | 455/403 |
| 8,966,590 B2* | 2/2015 | Janzer | H04L 63/20 | 713/152 |
| 9,043,887 B2* | 5/2015 | McLachlan | G06Q 20/4014 | 705/2 |
| 9,092,815 B2* | 7/2015 | Foerster | G06Q 30/0625 | |
| 9,105,050 B2* | 8/2015 | Tietzen | G06Q 30/02 | |
| 9,832,610 B2* | 11/2017 | Herz | H04W 4/029 | |
| 9,858,583 B2* | 1/2018 | Sobalvarro | G06Q 30/02 | |
| 9,892,424 B2* | 2/2018 | Abraham | G06Q 30/0251 | |
| 2011/0282821 A1* | 11/2011 | Levy | G06Q 30/0631 | 706/47 |
| 2014/0297438 A1* | 10/2014 | Dua | G06Q 20/20 | 705/21 |
| 2014/0344102 A1* | 11/2014 | Cooper | G06Q 30/0631 | 705/26.7 |

* cited by examiner

CROSS SELLING PLATFORM

TECHNICAL FIELD

Embodiments of the present disclosure relate generally to internet commerce, and more particularly, but not by way of limitation, to a cross selling platform.

BACKGROUND

Online commerce offers consumers a wide variety of goods and services and provides merchants many opportunities to cross sell or up sell related goods and services. However, many consumers still prefer offline commerce conducted at physical locations. The typical offline commerce experience provides limited opportunities to cross sell or up sell to the consumer and exposes consumers to fewer goods and services than online commerce.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
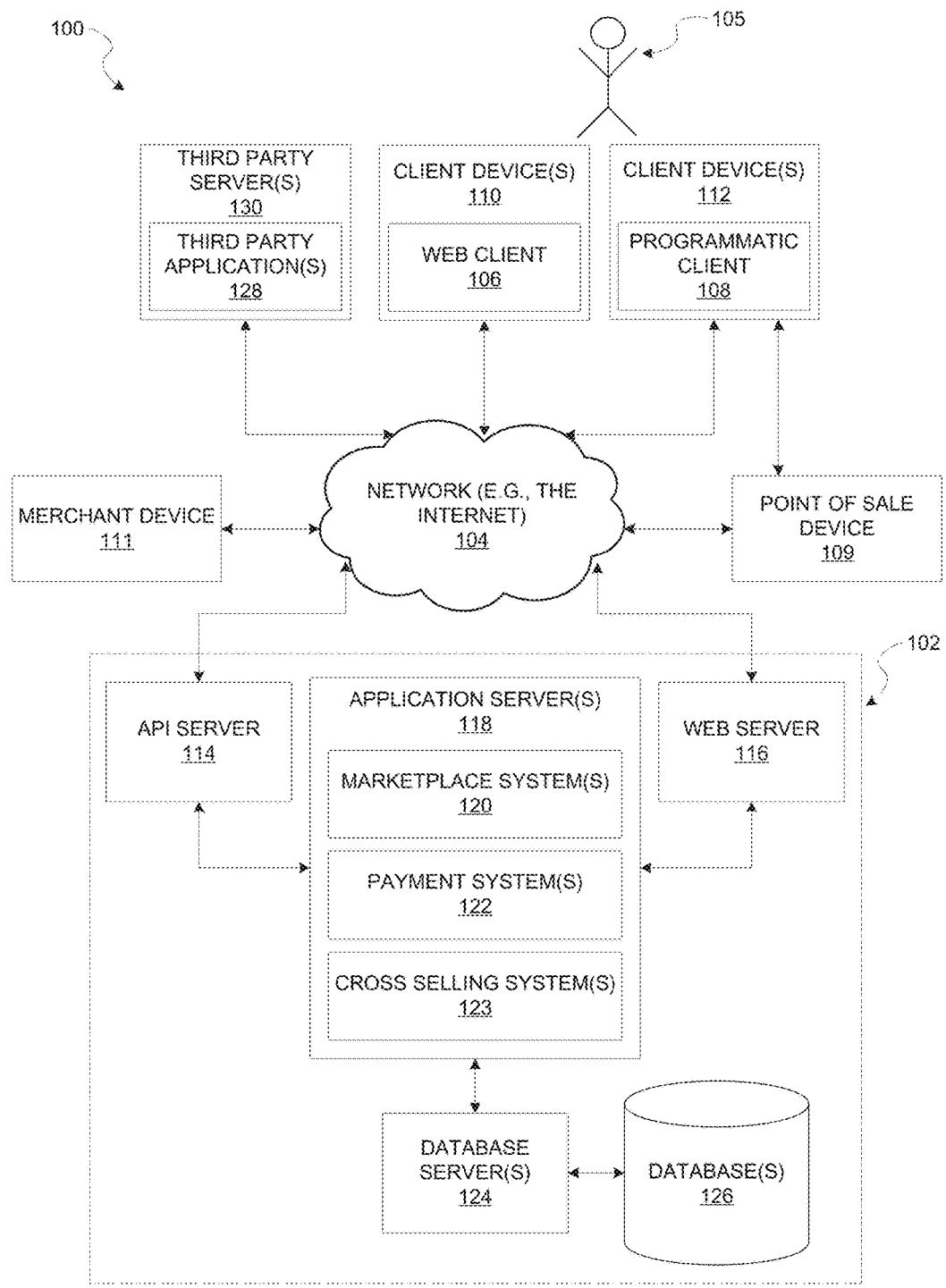
FIG. 1 is a block diagram of a networked system depicting an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Example embodiments provide systems and methods for a cross selling platform. The cross selling platform may recommend product listings to a user based on an in-store product located at a store of a merchant. The product listings may correspond to a products or services. For example, a request for a product listing may be triggered by the user and received at a cross selling system. In some example embodiments, the user may be located at the store of the merchant. The request for the product listing may include various information, such as, product information (e.g., name, description, price, brand, and so forth), user information, and contextual information. The user may trigger the request for the product listing in a number of ways. Some examples of the user triggering the request for the product listing may include the user purchasing the in-store product online for in-store pickup at the store of the merchant, the user purchasing the in-store product using a mobile device at the store of the merchant, the mobile device of the user detecting or scanning the in-store product (e.g., detecting a smart tag affixed to the product), and so on.

After receiving the request for the product listing, the cross selling system may access a plurality of product listings. Each of the product listings in the plurality of product listings may include listing information. The listing information may include information corresponding to the product of the product listing, such as location, price, description, availability (e.g., number of products available at different locations), promotional information, cross selling or up selling information (e.g., similar or complementary products to the product listing), and the like. In some example embodiments, the merchant may provide the plurality of product listings. For example, the merchant that operates the store where the user may be located may provide product listings to be recommended for sale to the user when the user triggers the request for the product listing. In some example embodiments, third party merchants may provide the plurality of product listings. In these example embodiments, the third party merchants may bid to fulfill the request for the product listing.

A related product listing from among the plurality of product listings may be identified based on the information included in the request for the product listing, listing information, and merchant criteria provided by the merchant. The related product listing may correspond to a related product (e.g., related items for sale) or related service (e.g., related services that may be complementary to another product or service). For example, if a user purchases skis, related product listings may be identified, such as ski jackets, ski equipment insurance, ski resort deals, and so forth. The merchant criteria may include criterion that prevent certain products from being identified (e.g., prevent competitor products from being identified). The merchant criteria may include a variety of rules and schemes that determine which product listings are identified.

Once a product listing has been identified, the product listing may be recommended to the user for sale. For example, the product listing may be communicated from the cross selling system to the client device and the client device may present the product listing to the user for sale. In some example embodiments, the user may request purchase of the product corresponding to the product listing, and the cross selling system may facilitate a transaction for the product.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110 and 112. FIG. 1 illustrates, for example, a web client 106 (e.g., a browser, such as the Internet Explorer browser developed by Microsoft® Corporation of Redmond, Wash. State) and a programmatic client 108 executing on respective client devices 110 and 112.

The client devices 110 and 112 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, wearable electronic devices (e.g., smart watches), or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client devices 110 and 112 may be devices of a user that are used to perform a transaction involving digital goods within the networked system 102. In one embodiment, the networked system 102 is a network-based marketplace that responds to requests for product listings, publishes publications comprising item listings of products available on the network-based marketplace, and manages payments for these marketplace transactions. One or more users 105 may be a person, a machine, or other means of interacting with client devices 110 and 112. In embodiments, the user 105 is not part of the network architecture 100, but may interact with the network architecture 100 via client devices 110 and 112 or another means.

A point of sale (POS) device 109 may be a device operable to facilitate a transaction (e.g., a cash register, a computer, a mobile payment device, and so on). In some example embodiments, the POS device 109 may communicate with network 104. In further example embodiments, the POS device 109 may communicate with client devices 110 and 112. For example, client devices 110 and 112 may be operable to perform mobile payments (e.g., providing account information and authorizing payments) for products at a store of a merchant using near field communication (NFC), a peer-to-peer connection, or other wired or wireless forms of communication.

An application program interface (API) server 114 and a web server 116 are coupled to, and provide programmatic and web interfaces respectively to, one or more application servers 118. The application servers 118 may host one or more marketplace system(s) 120, payment system(s) 122, and cross selling system(s) 123, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the marketplace system 120. The databases 126 may also store digital goods information in accordance with example embodiments.

The marketplace system(s) 120 may provide a number of marketplace functions and services to users 105 that access the networked system 102. The payment system 122 may likewise provide a number of payment services and functions to users. The payment system 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace system 120. The cross selling system 123 may provide functionality for receiving requests for product listings corresponding to an in-store product, identifying related product listings, recommending the related product listings for sale to the user, receiving a purchase request corresponding to the product listing, and facilitating payment for the product listing. While the marketplace system(s) 120, the payment system(s) 122, and the cross selling system(s) 123 are shown in FIG. 1 to form part of the networked system 102, it will be appreciated that, in alternative embodiments, each system 120, 122, and 123 may form part of a system that is separate and distinct from the networked system 102.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example. The marketplace system(s) 120, the payment system(s) 122, and the cross selling system(s) 123 could also be implemented as standalone software programs, which do not necessarily have networking capabilities.

The web client 106 accesses the marketplace system(s) 120, the payment system(s) 122, and the cross selling system(s) 123 via the web interface supported by the web server 116. Similarly, the programmatic client 108 accesses the various services and functions provided by the marketplace system(s) 120, the payment system(s) 122, and the cross selling system(s) 123 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Merchant device 111 may be a device of the merchant operable to communicate and exchange information with the cross selling system 123 via network 104. For example, the merchant device 111 may be a personal computer (PC), a server, a mobile device, and the like. The merchant device 111 may provide information to the cross selling system 123, which may be stored, for example, in databases 126 for later use by the cross selling system 123. In some example embodiments, the merchant device 111 may be a server and information may be retrieved form the merchant device 111 by the cross selling system 123.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
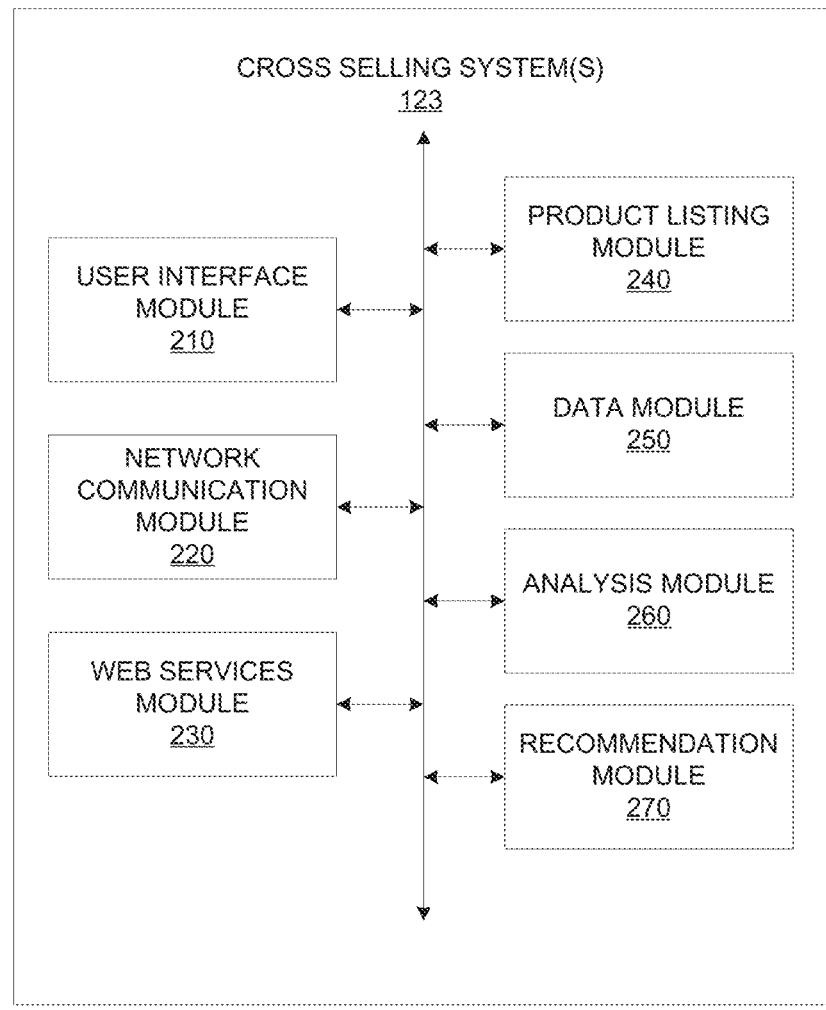
FIG. 2 is a block diagram depicting an example embodiment of a cross selling system.

FIG. 2 is a block diagram of the cross selling system(s) 123, which may provide a number of functions operable to respond to the request for a product listing by identifying and recommending the related product listing. The product listings may correspond to products and services. Product, as used herein, may mean an item for sale or a service. In an example embodiment, the cross selling system(s) 123 may include a user interface module 210, a network communication module 220, a web services module 230, a product listing module 240, a data module 250, an analysis module 260, and a recommendation module 270. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 210 may provide various user interface functionality operable to interactively present and receive information from the user 105. For example, the user interface module 210 may provide a user interface configured to receive merchant criteria, present product listings, and so on. Information may be presented using a variety of means including visually displaying information and using other device outputs (e.g., audio, tactile, and so forth). Similarly, information may be received by a variety of means including alphanumeric input or other device input (e.g., one or more touch screens, cameras, tactile sensors, light sensors, infrared sensors, biometric sensors, microphones, gyroscopes, accelerometers, other sensors, and so forth). It will be appreciated that the user interface module 210 may provide many other user interfaces to facilitate functionality described herein. Presenting may mean communicating information to a device (e.g., client devices 110 and 112), with the device having functionality operable to perform presentation using the communicated information. Interactively presenting may mean the exchange of information from the presenting device, the user 105, and the cross selling system 123.

The network communication module 220 may perform various network communication functions such as communicating with the client devices 110 and 112 and servers such as the application servers 118, the database servers 124, and the third party servers 130. Network communication may operate over any wired or wireless means to provide communication functionality.

The web services module 230 may perform various web services functions such as retrieving information from third party servers 130 and application servers 118. Information retrieved by the web services module 230 may include data associated with the user 105 (e.g., user profile information from an online account, social networking data associated with the user 105, and so forth), data associated with an item (e.g., images of the item, reviews of the item, and so forth), and other data.

The product listing module 240 may perform various functions for managing product listings. For example, the product listing module 240 may receive a request for a product listing triggered by the user. The product listing module 240 may also receive the plurality of product listings from the merchant or the third party merchants, communicate a fulfillment request corresponding to the request for the product listing to the merchant or the third party merchants, and identify related product listings from the plurality of product listings received from the merchant or the third party merchants.

The data module 250 may perform various functions for accessing and receiving data. For example, the data module 250 may access the plurality of product listings. The plurality of product listings may be stored, for example, in databases 126. In further embodiments, the data module 250 may retrieve information from third party servers 130 (e.g., online marketplace web sites, social networking sites, and so on) (for example, using the web services module 230). Some examples may include retrieving information relating to a product, a location, the merchant, the third party merchants, the user, and so on.

The analysis module 260 may perform various analyses using a variety of information. For example, the analysis module 260 may identify related product listings based on the product information included in the product listing request, merchant criteria, and listing information included in the product listing. The related product listing may correspond to related products or related services. Other information from other sources may be used when identifying the related product listings (e.g., user information that may include demographic information corresponding to the user).

The recommendation module 270 may recommend product listings for sale to the user. In an example embodiment, recommending the product listing to the user may include communicating the product listing to the client devices 110 and 112, and the client devices 110 and 112 may present the product listing to the user. The recommendation module 270 may cause the product listing to be presented to the user. In an example embodiment, the recommendation module 270 may use the user interface module 210 to generate a user interface operable to present the product listing to the user.

Figure 3:
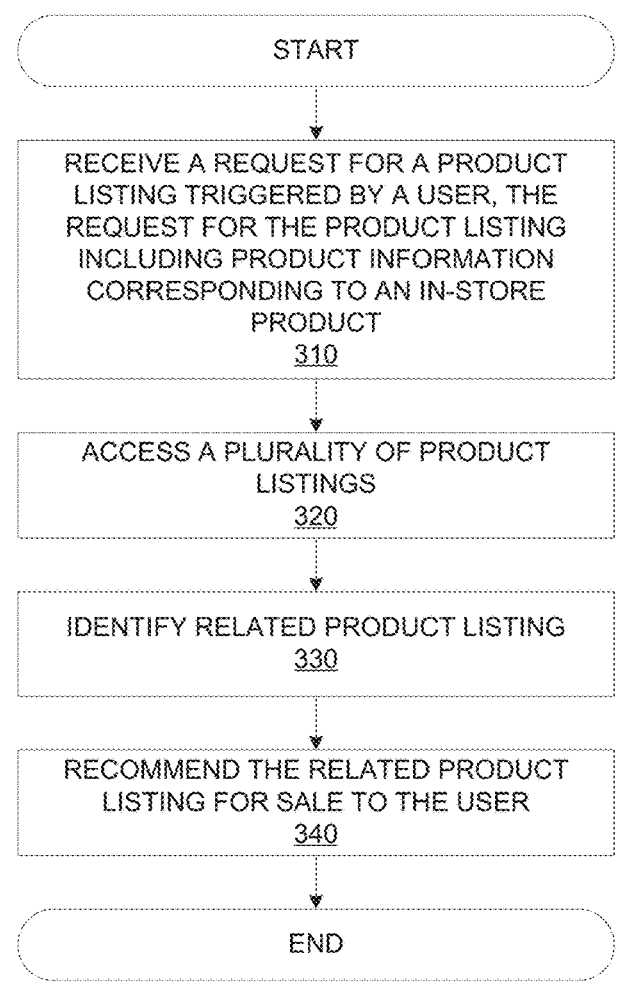
FIG. 3 is a flow diagram illustrating an example embodiment for recommending a product listing.

FIG. 3 is a flow diagram illustrating an example method 300 for recommending a product listing. At operation 310, the cross selling system 123, using the product listing module 240, may receive the request for the product listing triggered by the user. The user may trigger the request for the product listing in a number of different ways. In some example embodiments, the user may trigger the request for the product listings while the user is located at the store of the merchant, although the user may also trigger the request for the product listings from other locations. For example, the user may be located at the store of the merchant and may purchase an in-store product using the POS device 109 of the merchant. The purchasing of the in-store product by the user may trigger the request for the product listing. For instance, the POS device 109 may communicate the transaction to the cross selling system 123, thereby triggering the request for the product listings corresponding to the in-store product purchased by the user. In another instance, the POS device 109 may communicate the transaction to the client devices 110 and 112 and the client devices 110 and 112 may communicate the request for the product listings to the cross selling system 123.

In another example embodiment, the user may trigger the request for the product listing by scanning a bar code of the in-store product at the store of the merchant, for example, using client devices 110 and 112 (e.g., using a camera sensor on a mobile device to scan a quick response (QR) code). The bar code may be one-dimensional (e.g., universal product code (UPC) bar code), multi-dimensional (e.g., QR code, Aztec code, Data Matrix, Dataglyph, MaxiCode, PDF417, Ultra Code, UCC RSS-2D bar code, and so forth), radio frequency identification (RFID) tags, smart tags, any device capable of storing and communicating information (e.g., using NFC or a peer-to-peer connection), and so on. Various techniques may be used to scan the bar code, such as, optical (e.g., a camera sensor on a mobile device), NFC (e.g., using low energy Bluetooth), and the like.

In yet another example embodiment, the user may trigger the request for the product listing simply by moving within a distance of a RFID tag, smart tag, and the like. For example, the store of the merchant may have RFID tags, or similar smart tags, embedded throughout the store or in products. The client devices 110 and 112 may detect the presence of the smart tag when within a detection range and trigger the request for the product listing.

In still another example embodiment, the user may trigger the request for the product listing by moving within or outside of a defined geographic boundary. For example, the client devices 110 and 112 may be operable to determine current location using GPS or other location services (e.g., the store may be equipped with sensors that communicate to the client devices 110 and 112 via NFC or another communication means). The current location may be compared with the defined geographic boundary to determine whether the user has moved into or out of the defined geographic boundary. The defined geographic boundary may be stored on the client devices 110 and 112, on the third party servers 130 and communicated to the client devices 110 and 112, on the cross selling system 123 and communicated to the client devices 110 and 112, and so on. The defined geographic boundary may, for example, be a location within the store of the merchant with a particular selection of products (e.g., the sporting goods section of a store). In another example embodiment, the entire store, which may include the area surrounding the store, may be the defined geographic boundary. The user moving into or out of the defined geographic boundary may trigger the request for the product listings. Many schemes, technologies, and techniques may be employed to determine whether the user has moved into or out of the defined geographic boundary.

In other example embodiments, the user may trigger the request for the product listing by purchasing the product online. For example, the user may purchase a product online from the merchant for pickup at the store of the merchant. The purchasing of the product online may trigger the request for the product listing.

The request for the product listing may include various information, such as product information, user information, and contextual information. The product information may correspond to the in-store product located at the store of the merchant. Product information may include information, such as, name, description, brand, manufacturer, dimension, price, promotional information, images, audio clips, and so forth. In the example where the user purchased the product online for in-store pickup, the request for the product listing may include product information corresponding to the in-store product the user purchased online. In the example where the user scans the bar code (e.g., a QR code), the bar code may contain product identifying information and that identifying information may be used to retrieve information (e.g., from the market place system 120 or the third party servers 130) associate with the in-store product.

In an example embodiment, the user information may be provided by the merchant and included in the request for the product listing. In another example embodiment, the request for the product listing may include a user identifier and the cross selling system 123, using the data module 250, may retrieve the user information from various sources, such as the marketplace system 120, the third party servers 130, and elsewhere. In some example embodiments, additional user information in addition to the user information included in the request for the product listing, may be retrieved by the cross selling system 123, using the data module 250 (e.g., retrieve purchase history of the user from third party merchant websites). The user information may include, for example, user demographic information, age, gender, location, region, employment status, marital status, real-time location, income level, socioeconomic status, purchase history, information from the user's social network profiles (e.g., posts from the user on a social network), information from contacts of the user's social network profile (e.g., posts from friends of the user on a social network), and so forth.

In an example embodiment, contextual information may be included in the request for the product listing. The contextual information may include a variety of information from a variety of sources. For example, the context information may include the geographic location of the store, the store name, the types of products sold at the store, geographic information of the product, geographic information of the user (e.g., as received from GPS on a mobile device), whether the product for sale is discounted, operating hours of the store, other store information, other product information, and so on.

At operation 320, the cross selling system 123, using the data module 250, may access the plurality of product listings. The plurality of product listings may be accessed from, for example, the databases 126, the merchant device 111, the third party servers 130, and elsewhere. Each of the product listings in the plurality of product listings may include listing information associated with the product of the product listing, such as geographic location of the product, availability, price, description, promotional information, dimensions, images, audio clips, and the like.

In an example embodiment, the merchant that operates the store at which the user may be located may provide the plurality of product listings. The product listings may correspond to merchant products of the merchant located at the store of the merchant (e.g., and in-store product of the merchant). In some example embodiments, the product listings may correspond to products of third party merchants. For example, the merchant may provide the plurality of product listings and listing information associated with each product listing in the plurality of product listings to a user interface configured to receive product listings. The product listing module 240 may receive the plurality of product listings and store them to be accessed in the future by the cross selling system 123. The product listings may be provided to the cross selling system 123 before the user triggers the request for the product listing and accessed by the data module 250 when the request for the product listing is received.

In another example embodiment, the plurality of product listings may be accessed from the merchant device 111 or from the third party servers 130. For example, the merchant device 111 may be a server. The cross selling system 123, using the data module 250, may communicate with the merchant device 111 to access the plurality of product listings when the request for the product listing is received.

At operation 330, the cross selling system 123, using the analysis module 260, may identify a related product listing or many related product listings. A related product listing from among the plurality of product listings may be identified based on the information included in the request for the product listing, the listing information including in the product listing, and the merchant criteria. For example, the related product listing may be determined by analyzing the product information and the listing information included in the product listing using, for example, keyword matching, brand matching, geographic proximity, product category matching, product theme matching, and so forth. In a specific example, if the user purchases skis, the related product listing may be related to the theme of skiing, and the related product listing may be, for example, ski jackets, ski equipment insurance, ski resort deals, and so forth. In another example, product listings with a geographic location that is within a range may be identified by comparing the geographic location included in the listing information with the geographic location included in product contextual information. In some example embodiments, the relationships between the products may be predefined. In other example embodiments, the related product listing may be identified based on the product information and the listing information dynamically using a technique, such as, keyword matching between the product information and the listing information.

In some example embodiments, the merchant criteria may be used in the analysis to identify the related product listing using the analysis module 260. The merchant criteria may be provided by the merchant. Many different types of criteria may be included in the merchant criteria. For instance, the merchant criteria may include a criterion that prevents certain products from being identified (e.g., prevents competitor products from being identified). In another example, the merchant criteria may include a criterion that designates certain products or product types to be identified (e.g., currently promoted products, products to display when the request for the product listing includes certain information). For another example, the merchant criteria may include a criterion that specifies the type of merchant that may fulfill the request for the product listing, such as geographically proximate merchants (e.g., merchants that are within the same mall as the merchant, within the same city as the merchant, and so on). The merchant criteria may include a criterion that may display product listings with the highest commission rate or may set a minimum commission rate, for example. The merchant criteria may include a variety of rules and schemes that determine which product listings are identified.

The merchant criteria may be stored, for example, in the database 126 and retrieved using the data module 250. For example, the merchant, or the third party merchants, may provide the merchant criteria at a user interface configured to receive merchant criteria. After receiving the merchant criteria from the merchant, the data module 250 may store the merchant criteria to be used in the future by the cross selling system 123.

In some example embodiments, the user information corresponding to the user may be used to determine the related product listing, using the analysis module 260. In a specific example, the user's age may be used to identify product listings that are age appropriate for the user (e.g., products with a legal age requirement such as alcohol products). In another example, the gender of the user may be used to identify products listings for the specified gender of the user (e.g., women's apparel for women). In yet another example, the purchase history of the user may be used to determine the related product listings (e.g., identify product listings complementary to products purchased by the user in the past). Many varieties of analysis may be performed to identify the related product listings using the user information.

In further example embodiments, the contextual information included in the request for the product listing may be used to determine the product listing. For example, the contextual information may include the location of the store where the in-store product may have been purchased or picked-up by the user. Based on this information, near-by third party merchants that offer goods or services that may be complementary to the in-store product may have their product listings identified. Many different schemes and techniques may be employed to identify product listings using the contextual information.

In further example embodiments, other information may be used to identify related product listings. Information such as conversion information, engagement information, and other information, which may have been previously stored by the cross selling system 123, may be accessed and used to identify the related product listing. For example, a particular product may have a high conversion rate given a particular type of user. In that example, the product listing with the high conversion rate may be identified by the cross selling system 123.

In some example embodiments, multiple product listings may be identified at operation 330. The multiple product listings may, for example, be ranked according to relevance to the request for the product listing using the analysis module 260. Various information and schemes may be employed to rank the product listings by relevance.

At operation 340, the cross selling system 123, using the recommendation module 270, may recommend the related product listing for sale to the user. For example, the product listing may be communicated from the cross selling system 123 to the client devices 110 and 112. The client devices 110 and 112 may present the product listing to the user for sale. In some example embodiments, the user may request purchase of the product corresponding to the product listing, and the cross selling system 123 may facilitate a transaction for the product corresponding to the product listing.

In some example embodiments, the product listing may be recommended to the user for sale directly following the related product listing being identified. In another example embodiment, the related product listing may be identified at the operation 330 and in the future the related product listing recommended to the user. For example, if the user purchases the in-store product online for in-store pickup at the store of the merchant, the related product listing may be identified when the user makes the purchase online, and the recommending of the related product listing may not occur until the user is physically located at the store of the merchant. The cross selling system 123 may determine whether the user is located at the store of merchant using a number of techniques. For example, if the user is picking up the in-store product with a mobile device that includes GPS, the GPS location of the mobile device may be used to determine whether the user is located at the store of the merchant. In another example, the related product listing may be recommended to the user when the merchant verifies that the user has picked up the product (e.g., using the merchant device 111). Many other schemes and techniques may be employed to trigger the recommending of the related product listing to the user.

In the embodiment where the ranked lists of product listings may be identified at operation 330, at operation 340, the ranked lists may be recommended to the user for sale. For example, the ranked list may be communicated to the client devices 110 and 112 and the client devices 110 and 112 may display the ranked list of product listings in order of relevance to the user (e.g., on a display of a mobile device). Many other means of recommending the ranked list of product listings to the user for sale may be employed.

Figure 4:
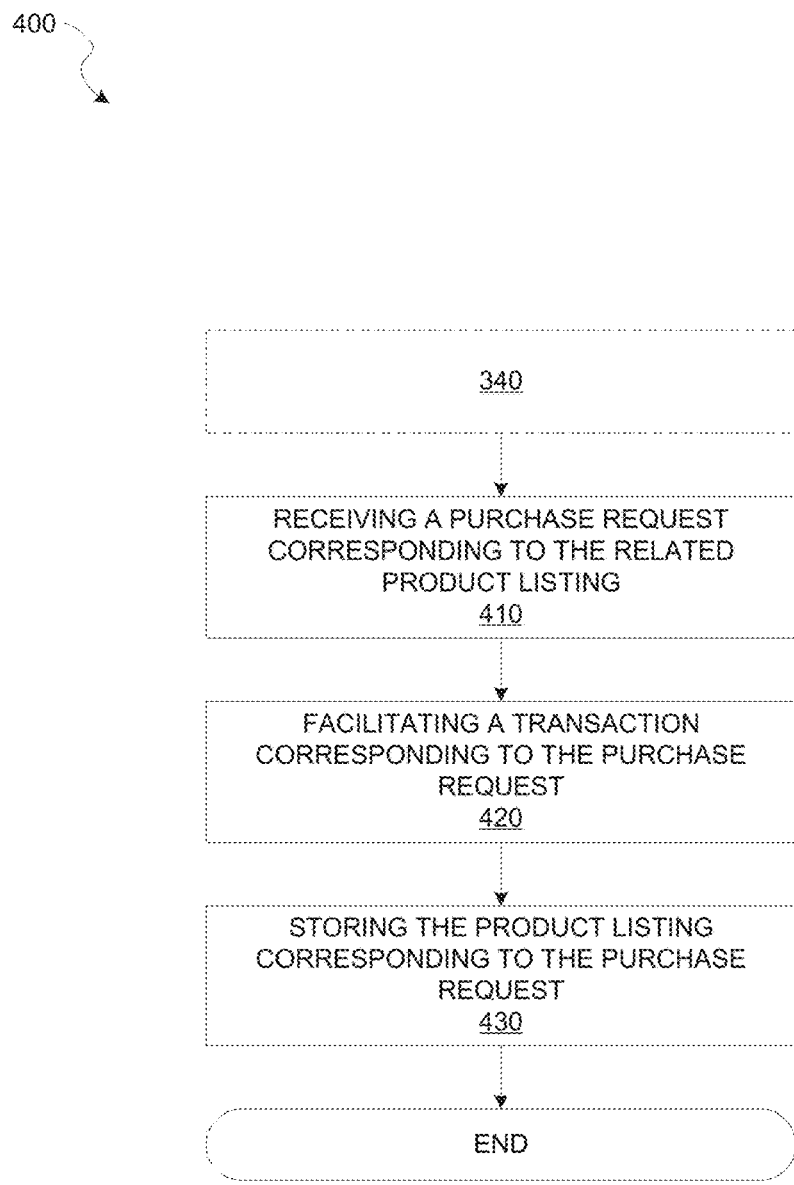
FIG. 4 is a flow diagram illustrating an example embodiment for facilitating a transaction.

FIG. 4 is a flow diagram illustrating an example method 400 for facilitating a transaction corresponding to the related product listing. At operation 410, the cross selling system 123, using the product listing module 240, may receive a purchase request corresponding to the related product listing. In an example embodiment, the purchase request may be received, for example, from the client devices 110 and 112. For instance, the cross selling system 123 may have identified the related product listing and recommended the related product listing to the user by communicating the product listing to the client devices 110 and 112 and the client devices 110 and 112 may present the product listing to the user. The user may, for example, have generated the purchase request via a user interface configured to receive the purchase request corresponding to the related product listing. After the user has generated the purchase request, the client devices 110 and 112 may communicate the purchase request to the cross selling system 123.

At operation 420, the cross selling system 123, using the product listing module 240, may facilitate a transaction corresponding to the purchase request. The transaction corresponding to the purchase request may be facilitated via a number of means. In an example embodiment, the transaction may be performed by the payment system 122. In another example embodiment, the transaction may be performed by a payment system of the merchant using, for example, the merchant device 111. In this embodiment, the purchase request may be communicated to the merchant device 111 from the cross selling system 123. In yet another example embodiment, the transaction may be performed by the POS device 109. In this embodiment, the user located at the store of the merchant may make a payment at POS device 109, and the POS device 109 may communicate the transaction to the cross selling system 123. In some example embodiments, the cross selling system 123 may communicate the purchase request to the POS device 109, and the POS device 109 may perform the transaction. In still other embodiments, the transaction may be performed by third party payment services at the third party servers 130. In this embodiment, the payment request may be communicated to the third party servers 130, and the third party servers 130 may perform the transaction. Many schemes may be employed to facilitate the transaction corresponding to the purchase request.

At operation 430, the cross selling system 123, using the product listing module 240, may store the product listing corresponding to the purchase request. For example, the purchase request may be stored in association with the user and used in the future to determine related product listings with high conversion rates. The contextual information, product information, and user information may be stored in association with the listing that resulted in a purchase to determine what type of consumer may purchase the product in future analysis by the cross selling system 123.

Figure 5:
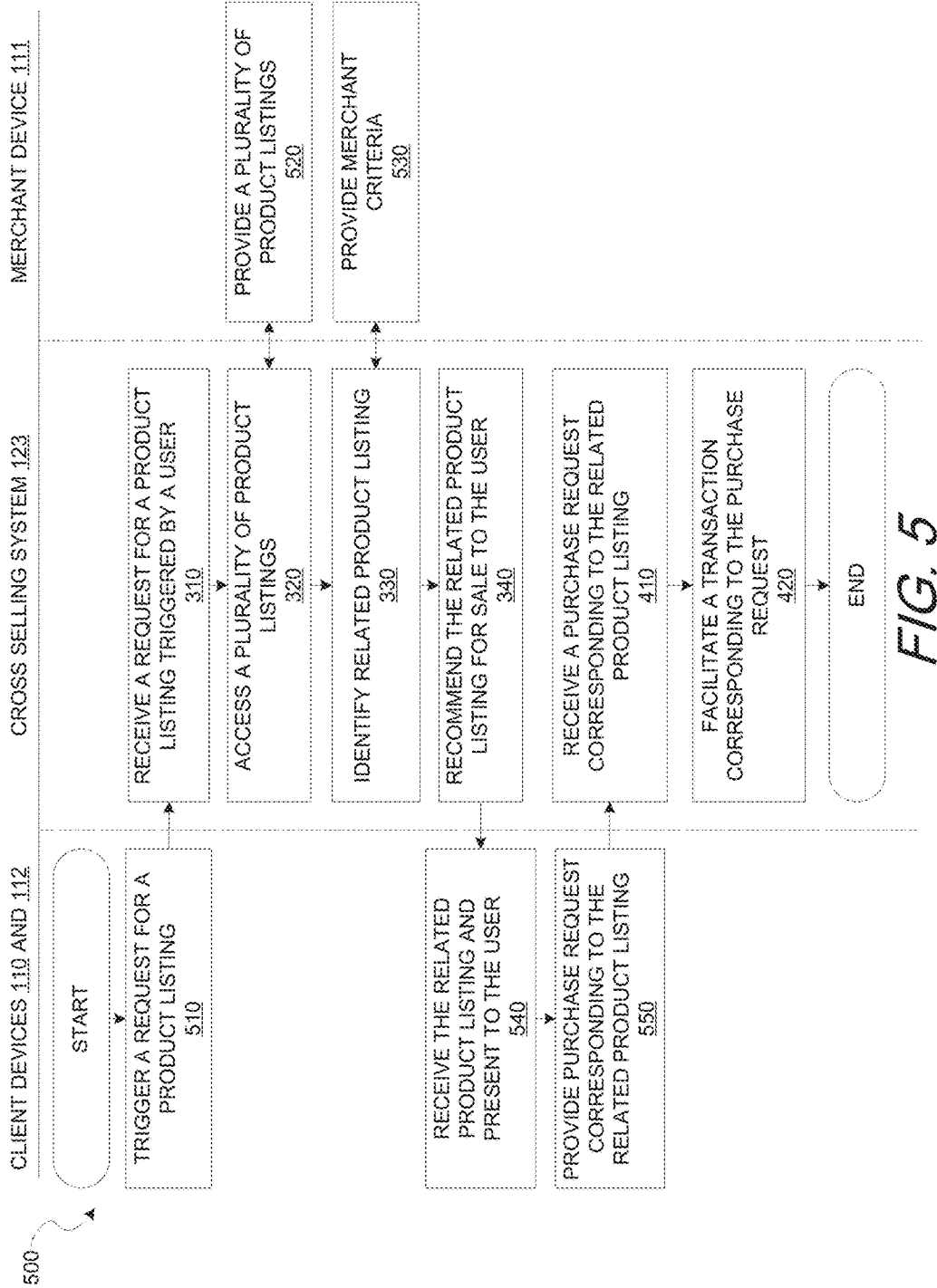
FIG. 5 is a flow diagram illustrating an example embodiment for recommending a product listing and facilitating a transaction.

FIG. 5 is a flow diagram 500 that depicts an example embodiment of interaction and communication between various devices and systems to recommend the related product listing in response to the request for the product listing in an example embodiment. At operation 510, the client devices 110 and 112 may provide the request for the product listing triggered by the user as described above.

The request for the product listing may be received by the cross selling system 123 at operation 310, as described above.

The cross selling system 123 may access a plurality of product listings at operation 320 from, for example, the merchant device 111 as depicted. At operation 520, in an example embodiment, the merchant device 111 may provide the plurality of product listings (e.g., via a user interface configured to receive the plurality of product listings). In other example embodiments, the merchant device 111 may have provided the plurality of product listings before the request for the product listings, and the plurality of product listings may be stored, for example, at the cross selling system 123 and accessed from the cross selling system 123.

The cross selling system 123 may identify the related product listings at operation 330. In an example embodiment, the related product listing may be identified using the merchant criteria that may be provided by the merchant using merchant device 111, as depicted. At operation 530, in an example embodiment, the merchant device 111 may provide the merchant criteria (e.g., via a user interface configured to receive the merchant criteria). The merchant criteria may be provided to the cross selling system 123 prior to the request for the product listing, in an example embodiment.

At operation 340, the cross selling system 123 may recommend the related product listing for sale to the user. In the depicted example embodiment, the cross selling system may communicate the product listing to the client devices 110 and 112.

The client devices 110 and 112 may receive the related product listing and present the related product listing to the user at operation 540. For example, the presentation may be an image, an audio clip, an animation, or other device output (e.g., NFC transmission, tactile feedback, and so forth). The presentation may be interactive. For instance, the user may activate the presented related product listing to generate the purchase request corresponding to the related product listing. The user may activate the presented related product listing using a variety of methods (e.g., tapping a touch screen display on a mobile device).

Once the purchase request is generated, the client devices 110 and 112 may provide the purchase request corresponding to the related product listing to the cross selling system 123 at operation 550. In some example embodiments, the purchase request may be communicated to other devices, such as the third party servers 130, the POS device 109, and the merchant device 111 to facilitate the transaction, as described above.

As described above, the purchase request may be received by the cross selling system 123 at operation 410, and the cross selling system 123 may facilitate the transaction corresponding to the purchase request at operation 420. Although not depicted, the cross selling system 123 may communicate with the merchant device 111, the client devices 110 and 112, the POS device 109, and the third party servers 130 to facilitate the transaction.

FIG. 5 is merely an example of communication and interaction between devices and is in no way limiting. In other example embodiments, other devices and systems of the merchant, the third party merchants, the user, and the cross selling system 123 may communicate in a variety of means. In some example embodiments, the cross selling system 123 may provide a number of different application programmer interfaces (APIs) that may be implemented by the merchant, the third party merchants, the user, and other parties to facilitate the functionality described herein. For example, the cross selling system 123, may provide the APIs that the merchant may integrate into a first party application. In this example, the merchant may have created a merchant application that may be running on client devices 110 and 112. The merchant application may invoke the functionality of the cross selling system 123 using the APIs. For example, the merchant application may communicate the request for the product listing using the APIs, for example. The APIs may provide many other functions to facilitate the functionality of the cross selling system 123.

In another example embodiment, the APIs may be integrated by third party payment applications. For example, at the operation 420 described above, the cross selling system 123, using the product listing module 240, may facilitate a transaction corresponding to the purchase request using third party payment services. For example, the third party payment services may be provided via a third party payment application. The third party payment application may integrate the APIs of the cross selling system 123 and may invoke the functionality of the cross selling system 123 using the APIs.

In yet another example embodiment, the APIs may be integrated by, for example, an online marketplace web page of the merchant. In the example where the request for the product listing is triggered by the user purchasing a product online, the online marketplace web page may integrate the APIs of the cross selling system 123 to communicate the request for the product listing. Various other functionality may be invoked by the online marketplace web page using the APIs of the cross selling system 123.

Figure 6:
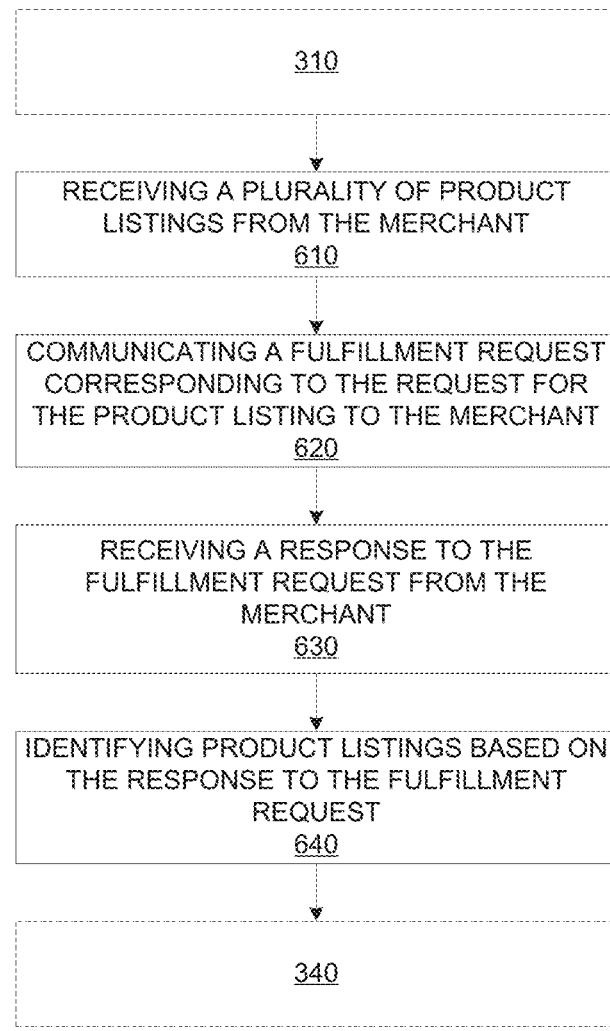
FIGS. 6 and 7 are flow diagrams illustrating an example embodiment for requesting fulfillment of a request for a product listing.

FIG. 6 is a flow diagram illustrating an example embodiment for requesting fulfillment of a request for a product listing. After operation 310, the plurality of product listings may be received at the cross selling system 123, using the product listing module 240, from the merchant at operation 610. As described above, in some example embodiments, the merchant may provide the product listings before the request for the product listing is received. The plurality of product listings may be provided via a user interface configured to receive product listings and listing information associated with each product listing in the plurality of product listings. In some example embodiments, the plurality of product listings provided by the merchant may be product listings that correspond to in-store products of the merchant located at the store of the merchant.

At operation 620, the cross selling system 123, using the product listing module 240, may communicate a fulfillment request corresponding to the request for the product listing to the merchant. The fulfillment request may include the information included in the request for the product listing, such as the product information, the user information, and the contextual information. The merchant may respond to the fulfillment request, causing the cross selling system 123 to identify and recommend a particular product listing associated with the merchant. In some example embodiments, the merchant may respond to the fulfillment request based on merchant specified rules. For example, the merchant may be interested in fulfilling requests for product listings for certain stores during certain times of day. In some example embodiments, all fulfillment requests may be automatically responded to and fulfilled with merchant provided product listings. Many other rules and schemes may be employed to respond to fulfillment requests based on the information included in the request for the product listing and other information.

At operation 630, the cross selling system 123, using the product listing module 240, may receive a response to the fulfillment request from the merchant. The response to the fulfillment request may be communicated, for example, from the merchant device 111 to the cross selling system 123. In some example embodiments, the merchant may automatically response to fulfillment requests, or predefine responses in advance (e.g., the merchant may specify a certain quantity of product listing fulfillments prior to the requests for product listings being received).

At operation 640, the cross selling system 123, using the analysis module 260, may identify the related product listings based on the response to the fulfillment request. For example, if the merchant responded to the fulfillment request, the product listing may then be identified by the cross selling system 123, using the analysis module 260. In another example, if the merchant does not respond to the fulfillment request or responds to the fulfillment request by declining the fulfillment request, then the product listing associated with the merchant may not be identified and recommended to the user. After the product listing has been identified, the operation 340 may recommend the product listing to the user as described above.

In some example embodiments, revenue may be shared between the cross selling system 123 and the merchant. In an example scheme, if the user purchases the product corresponding to the product listing recommended for sale to the user, the cross selling system 123 may receive a percentage of the sale. In another example, the cross selling system 123 may receive a fixed fee for each product listing recommended to the user for sale. Many other schemes may be employed. In an example embodiment, the cross selling system 123 may facilitate the transaction corresponding to the purchase request, as described above. In this example embodiment, in facilitating the transaction, the cross selling system 123 may extract a share of revenue directly from the proceeds of the transaction.

Figure 7:
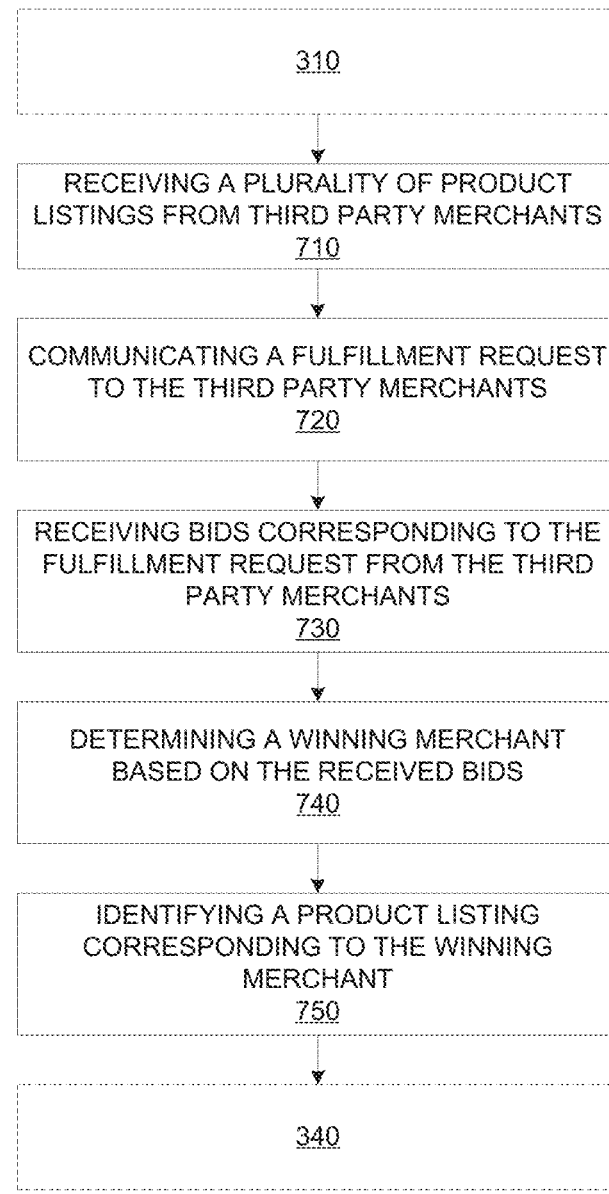

FIG. 7 is a flow diagram illustrating an example embodiment for requesting fulfillment of a request for a product listing to the third party merchants. After the operation 310, a plurality of product listings may be received, at the cross selling system 123, using the product listing module 240, from the third party merchants (e.g., merchants that are not affiliated with the store of the merchant) at operation 710. As described above, in some example embodiments, the third party merchants may provide the product listings before receiving the request for the product listing. The plurality of product listings may be provided via a user interface configured to receive product listings and listing information associated with each product listing in the plurality of product listings.

At operation 720, the cross selling system 123, using the product listing module 240, may communicate the fulfillment request corresponding to the request for the product listing to the third party merchants. Similar to operation 620, at operation 720, the fulfillment request may include the information included in the request for the product listing, and the third party merchants may bid on the fulfillment request. For example, a particular merchant among the third party merchants may be interested in requests for product listings generated at a particular geographic region (e.g., a particular shopping mall, a city, a state, and so on). The particular merchant may automatically bid on the fulfillment request if it is within the specified geographic region. The third party merchants may specify bidding rules using the information included in the request for the product listing. Many schemes and techniques may be employed for the third party merchants to bid on the fulfillment request.

At operation 730, the cross selling system 123, using the product listing module 240, may receive bids corresponding to the fulfillment request from the third party merchants. For example, the bids may be communicated from the respective merchant devices (e.g., the merchant device 111) of each of the third party merchants. In some example embodiments, the bids may be received for the fulfillment request for the product listing in real-time. In other words, once the request for the product listing is received, the fulfillment request may be communicated and bidding for the fulfillment request may begin immediately. In other example embodiments, bids for the fulfillment request may be received prior to the request for the product listing being received (e.g., a third party merchant may place a bid to fulfill the next one hundred requests for a product listing at a given price).

At operation 740, the cross selling system 123, using the product listing module 240, may determine a winning merchant based on the received bids. In an example embodiment, the determination of the winning merchant may simply be based on the highest bidding third party merchant. In other example embodiments, the winning merchant may be based on various information and factors. For example, a particular merchant may be declared the winning bidder despite not have the highest bid. This may occur in a scheme where the winning bidder is determined not only on bid price, but on the likelihood of conversion of recommending the product listing of the particular merchant to the user for sale. Many other schemes may be employed to determine that winning merchant.

At operation 750, the cross selling system 123, using the analysis module 260, may identify the related product listings corresponding to the winning merchant determined at operation 740. For example, a particular merchant may have made the highest bid and thereby was determined to be the winning merchant. A product listing provided by the winning merchant may be identified at operation 750 as a result of the winning merchant providing the highest bid. After the product listing has been identified, the operation 340 may recommend the product listing to the user, as described above.

In some example embodiments, revenue may be shared between the cross selling system 123, the merchant, and the third party merchants. In some example embodiments, the bid may be distributed between the merchant and the cross selling system 123 using various schemes. In an example scheme, if the user purchases the product corresponding to the product listing recommended for sale to the user, the cross selling system 123 may receive a percentage of the sale and the merchant may receive a percentage of the sale. In another example, the cross selling system 123 may receive a fixed fee for each product listing recommended to the user for sale and the merchant may receive a percentage of the sale. In an example embodiment, the cross selling system 123 may facilitate the transaction corresponding to the purchase request, as described above. In this example embodiment, in facilitating the transaction, the cross selling system 123 may extract a share of revenue directly from the proceeds of the transaction and distribute the revenue between the merchant and the cross selling system 123. Many other schemes may be employed.

Figure 8:
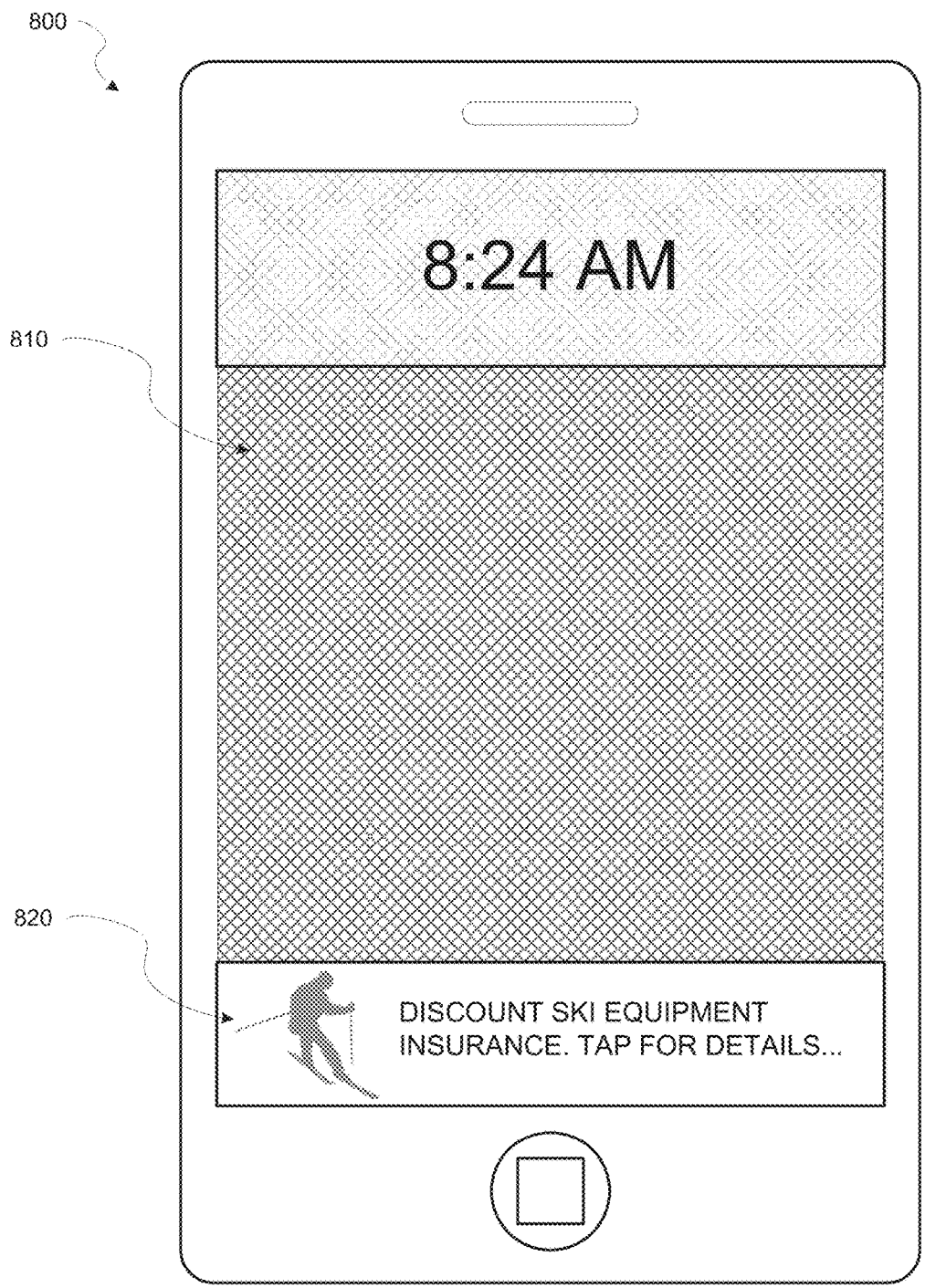
FIGS. 8 and 9 depict example user interfaces for presenting a product listing.

FIG. 8 depicts an example user interface for presenting the product listing. For example, device 800 may be a mobile phone, although any device capable of presenting the product listing may be employed. Display 810 may display images to the user. However, the presenting of the product listing need not be visual. As described above, the presentation may be auditory or tactile and use a variety of device outputs. User interface (UI) element 820 may be an example embodiment of presenting the product listing. In this example embodiment, UI element 820 is an image with a description related to the product listing. A variety of presentation formats using a variety of product listing information may be used to present the product listing to the user.

Figure 9:
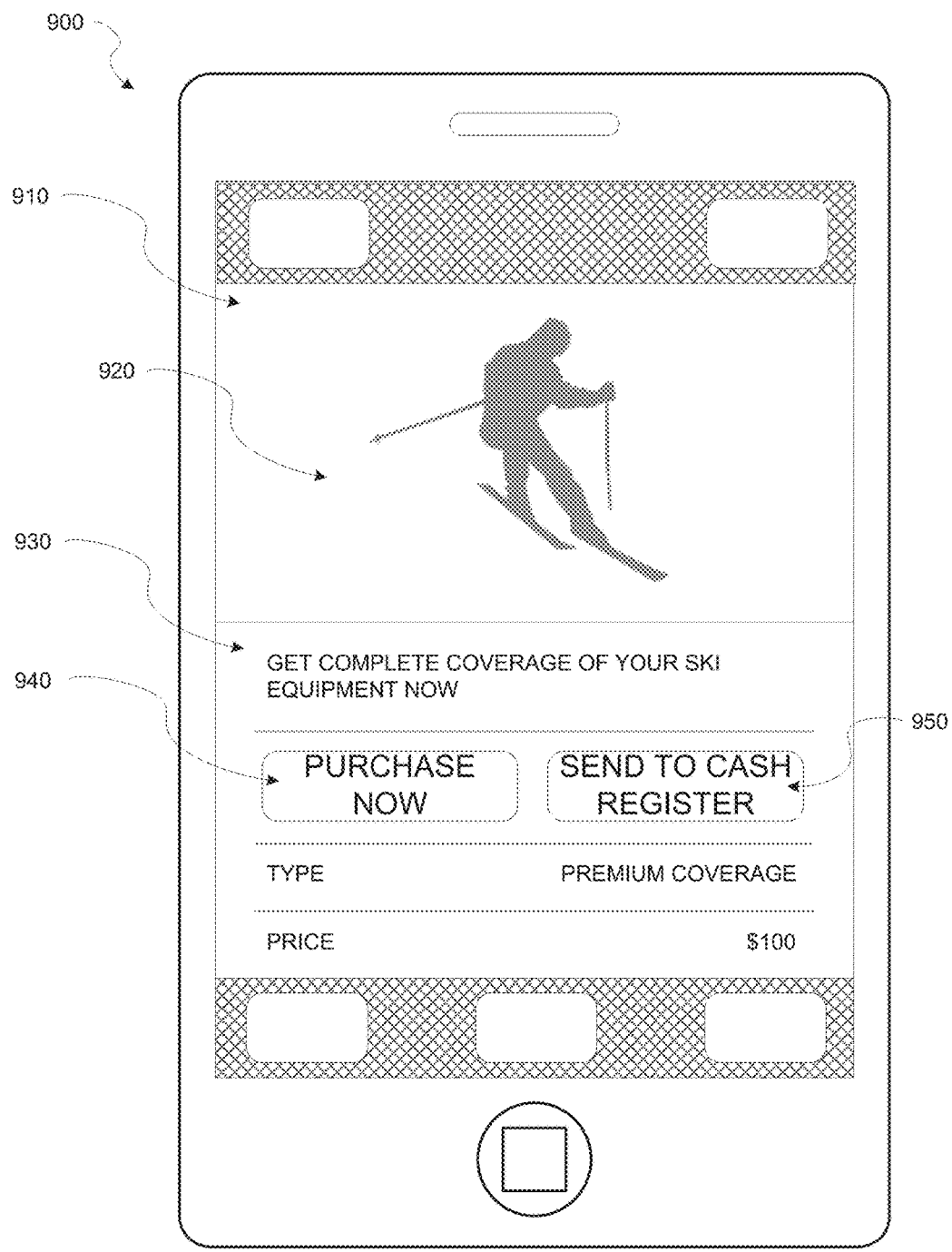

FIG. 9 depicts an example user interface for presenting further detail relating to a product listing and an option to purchase the product that corresponds to the product listing. In this example embodiment, device 900 may include a display 910. The display 910 may display information corresponding to the product listing. For example, the display may present a product image, such as UI element 920, a product description, such as UI element 930, and an option to purchase the product corresponding to the product listing, such as UI element 940 and UI element 950. In this example embodiment, the user may activate UI element 940 (e.g., tapping the UI element 940 on a touch screen device) to generate a request to purchase the product corresponding to the product listing. In some example embodiments, an in-application purchase, or in-app purchase, of the product corresponding to the product listing may be made by activating the UI element 940. In another example embodiment, UI element 950 may provide an option to perform the transaction using the POS device 109, for example. Many varieties of payment options may be presented to the user that may include third party payment services, payment using the POS device 109 of the merchant, in-app purchasing, and other means of performing the transaction. Many varieties of UI elements and presentation formats may be employed to present the product listing information to the user.

Figure 10:
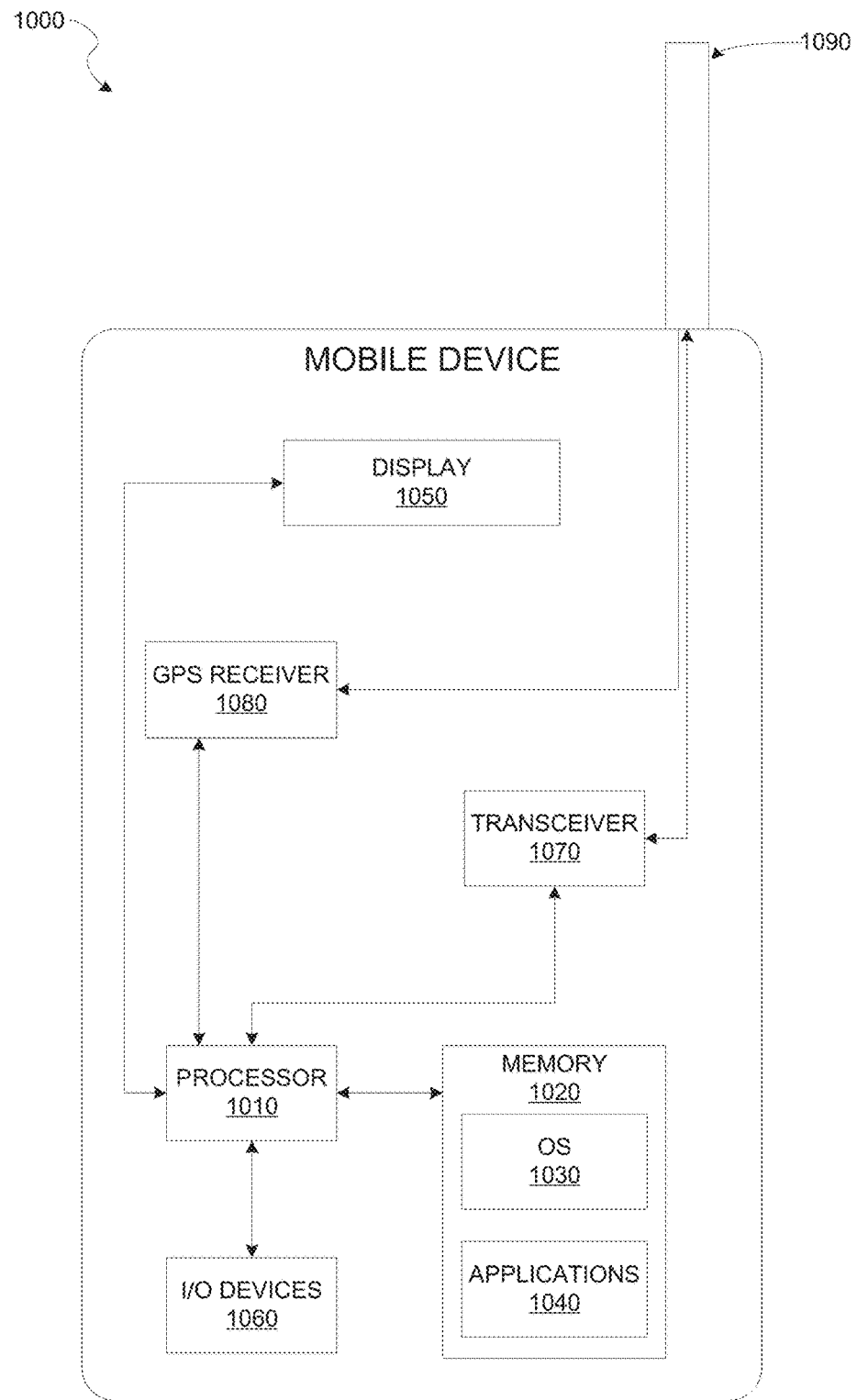
FIG. 10 is a block diagram illustrating a mobile device, according to an example embodiment.

FIG. 10 is a block diagram illustrating a mobile device 1000, according to an example embodiment. The mobile device 1000 may include a processor 1010. The processor 1010 may be any of a variety of different types of commercially available processors suitable for mobile devices (e.g., an XScale architecture microprocessor, a Microprocessor without Interlocked Pipeline Stages (MIPS) architecture processor, or another type of processor). A memory 1020, such as a random access memory (RAM), a Flash memory, or other type of memory, is typically accessible to the processor. The memory 1020 may be adapted to store an operating system (OS) 1030, as well as application programs 1040, such as a mobile location enabled application that may provide location based services (LBSs) to a user. The processor 1010 may be coupled, either directly or via appropriate intermediary hardware, to a display 1050 and to one or more input/output (I/O) devices 1060, such as a keypad, a touch panel sensor, a microphone, and the like. Similarly, in some embodiments, the processor 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile device 1000. In this manner, a connection with a network such as network 104 of FIG. 1 may be established. Further, in some configurations, a GPS receiver 1080 may also make use of the antenna 1090 to receive GPS signals. Additional details regarding providing and receiving location-based goods and services using a GPS system can be found in U.S. patent application Ser. No. 13/340,626 entitled "Methods and Systems for Using a Co-Located Group as an Authorization Mechanisms," assigned to the assignee of the instant application, which application is hereby incorporated by reference in its entirety.

Modules, Components, and Logic

Figure 11:
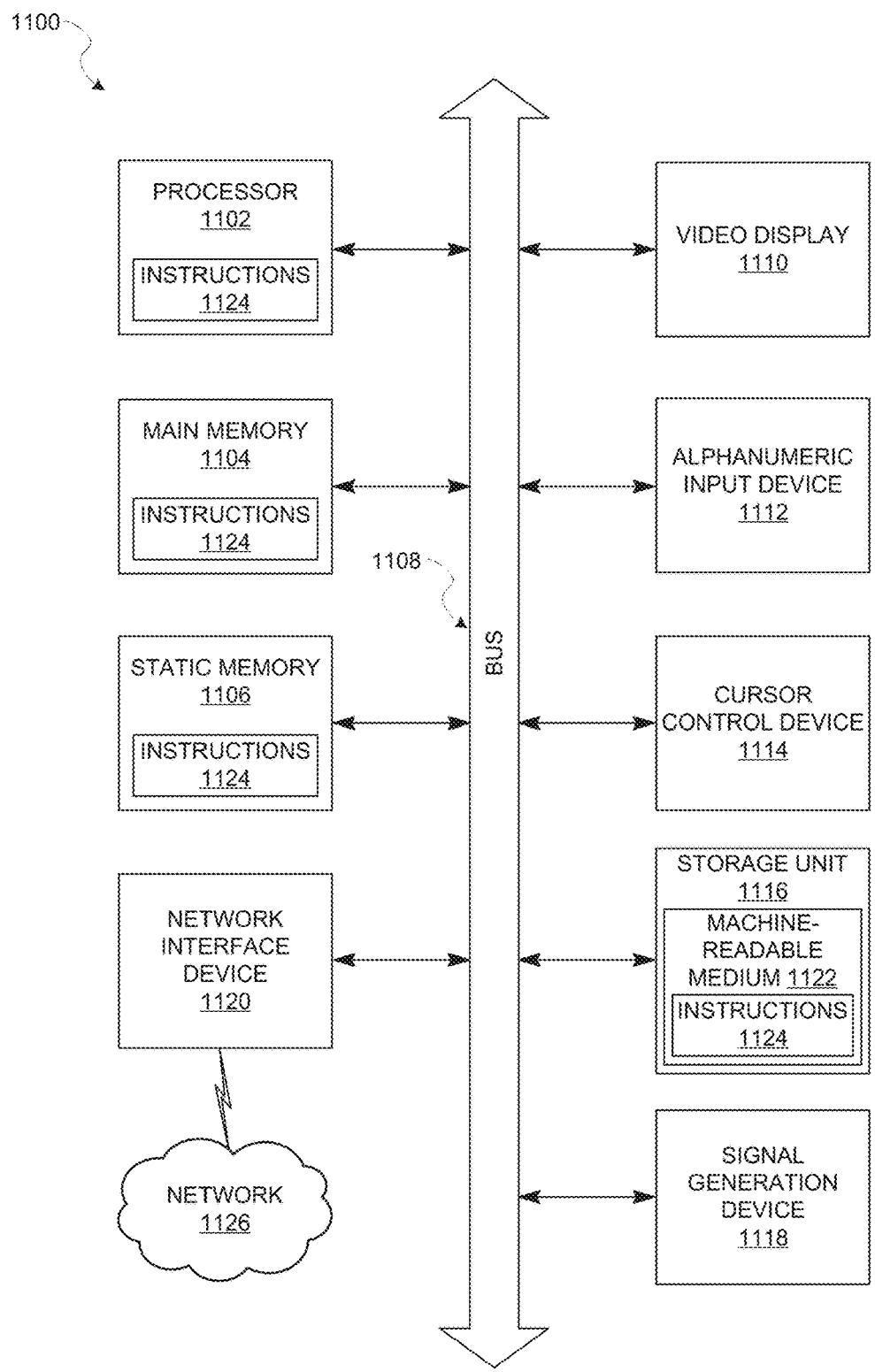
FIG. 11 is an example embodiment of a computer system in conjunction with the present inventive subject matter.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1124 (e.g., software, a program, an application, an applet, an app, or other executable code) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine 1100 is illustrated, the term "machine" shall also be taken to include a collection of machines 1100 that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a video display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or both, during execution thereof by the machine 1100. Accordingly, the main memory 1104, static memory 1106 and the processor 1102 may be considered as machine-readable media 1122. The instructions 1124 may be transmitted or received over a network 1126 via the network interface device 1120.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions 1124. The term "machine-readable medium" shall also be taken to include any medium, or combination of multiple media, that is capable of storing instructions (e.g., instruction 1124) for execution by a machine (e.g., machine 1100), such that the instructions, when executed by one or more processors of the machine 1100 (e.g., processor 1102), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1122 is non-transitory in that it does not embody a propagating signal. However, labeling the machine-readable medium 1122 as "non-transitory" should not be construed to mean that the medium is incapable of movement; the medium should be considered as being transportable from one physical location to another. Additionally, since the machine-readable medium 1122 is tangible, the medium may be considered to be a machine-readable device.

The instructions 1124 may further be transmitted or received over a communications network 1126 using a transmission medium via the network interface device 1120 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1122 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1102, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions described herein. As used herein, "processor-implemented module" refers to a hardware module implemented using one or more processors 1102.

Similarly, the methods described herein may be at least partially processor-implemented, with a processor 1102 being an example of hardware. For example, at least some of the operations of a method may be performed by one or more processors 1102 or processor-implemented modules. Moreover, the one or more processors 1102 may also operate to support performance of the relevant operations in a "cloud computing" environment or as a "software as a service" (SaaS). For example, at least some of the operations may be performed by a group of computers (as examples of machines 1100 including processors 1102), with these operations being accessible via a network 1126 (e.g., the Internet) and via one or more appropriate interfaces (e.g., an application program interface (API)).

The performance of certain of the operations may be distributed among the one or more processors 1102, not only residing within a single machine 1100, but deployed across a number of machines 1100. In some example embodiments, the one or more processors 1102 or processor-implemented modules may be located in a single geographic location (e.g., within a home environment, an office environment, or a server farm). In other example embodiments, the one or more processors 1102 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized cross-selling system, comprising:
one or more processors; and
one or more computer storage media storing computer-usable instructions that, when used by the one or more processors, cause the one or more processors to:
receive, for each merchant in a set of merchants, a merchant criteria and a plurality of product listings associated with the merchant, wherein the associated merchant criteria includes a set of rules to identify, for each product listing in the associated plurality of product listings, at least one related product listing included in the associated plurality of product listings;
receive, over a computer network from a client device, a request for product listings related to an identified product, wherein the request includes product information that corresponds to the identified product;
determine that at least one product listing included in at least one of the received plurality of product listings is related to the identified product based on the received request, at least one of the received merchant criteria, and a determination of availability in at least one of a plurality of stores associated with at least one merchant in the set of merchants; and
communicating each determined related product listing over the computer network to the client device as a recommendation for sale.

2. The computerized cross-selling system of claim 1, wherein the request is received based on a fulfillment request communicated to each server associated with each merchant in the set of merchants, wherein the fulfillment request corresponds to the identified product.

3. The computerized cross-selling system of claim 2,
wherein the set of merchants includes a plurality of merchants,
wherein the instructions further cause the one or more processors to:
determine, based on a responsive bid for the communicated fulfillment request received from each server associated with each merchant in the plurality of merchants, that a first merchant in the plurality of merchants is a winning merchant, and
wherein the at least one of the received merchant criteria is a first merchant criteria associated with the first merchant, and the at least one of the received plurality of product listings is a first received plurality of product listings associated with the first merchant.

4. The system of claim 1, wherein the client device is configured to generate the request for the product listings based on a determination that the client device is located within a geographic boundary associated with at least one of the plurality of stores.

5. A method, comprising:
receiving, by a cross-selling system and for each merchant in a set of merchants, merchant criteria from a merchant system associated with the merchant, the merchant criteria identifying product listings to be excluded from related products listings for the merchant;
receiving, by the cross-selling system from a client device, a request for a product listing, the request including product information corresponding to an in-store product located at a first store of a first merchant in the set of merchants;
identifying, by the cross-selling system, a related product listing from a stored plurality of product listings based at least in part on the included product information, each product listing of the stored plurality of product listings corresponding to a merchant product associated with at least the first merchant and determined to be available for sale in at least the first store of the first merchant; and
transmitting, by the cross-selling system to the client device, a notification that includes the identified related product listing as a recommendation for sale.

6. The method of claim 5,
wherein the stored plurality of product listings was retrieved from the merchant system associated with the first merchant in response to the received request for the product listing,
the method further comprising:
communicating, to the merchant system associated with the first merchant, a fulfillment request that corresponds to the in-store product, the fulfillment request being communicated based on a received transmission from the client device, and
wherein the related product listing is identified based on a response received, from the merchant system associated with the first merchant, in response to the communicated fulfillment request.

7. The method of claim 5,
wherein the stored plurality of product listings was retrieved from each merchant system associated with each merchant in the set of merchants based on the received request for the product listing,
the method further comprising:
communicating, to each merchant system associated with each merchant in the set of merchants, a fulfillment request that corresponds to the in-store product, the fulfillment request being communicated based on a received transmission from the client device, and
wherein the related product listing is identified based further in part on a determination that a highest bid in a plurality of bids received from each merchant system in response to the communicated fulfillment request was received from the merchant system associated with the first merchant.

8. The computerized cross-selling system of claim 1, wherein the determined at least one related product listing is communicated to the client device based on a determination that the client device is physically located at a store of a merchant in the set of merchants.

9. The method of claim 5, wherein the request for the product listing is received based on a determination that the client device is located at the first store of the first merchant.

10. The computerized cross-selling system of claim 8, wherein the determination is made based on a received global positioning system (GPS) location associated with the client device.

11. The method of claim 5, wherein the merchant criteria includes rules to identify the related product listing.

12. The method of claim 5, wherein the merchant criteria includes a threshold geographic distance, and wherein the related product listing is identified based further in part on the included threshold geographic distance.

13. The method of claim 5, further comprising:
receiving, from the client device by the cross selling system, a purchase request corresponding to the identified related product listing included in the transmitted notification; and
facilitating, by the cross selling system, a transaction corresponding to the received purchase request.

14. The method of claim 13, wherein facilitating the transaction comprises communicating, by the cross selling system, the received purchase request to a point of sale device located at the first store of the merchant.

15. The method of claim 13, wherein the identified related product listing is stored, by the cross-selling system, for additional analysis.

16. The method of claim 5, wherein the request for the product listing further includes contextual information associated with the first store of the merchant, the in-store product, and a user associated with the client device.

17. The method of claim 5, further comprising:
accessing, by the cross-selling system, stored user information determined associated with the client device, and wherein the related product listing is identified based further in part on the accessed user information.

18. The method of claim 17, wherein the accessed user information includes at least one of user demographic information, purchase history, and location information.

19. The method of claim 5, wherein the request for the product listing is received based on a determination that at least one of the client device is located at the first store of the first merchant, an identifier associated with the user corresponds to a purchase of the in-store product at the first store of the first merchant, the client device scanned the in-store product at the first store of the first merchant, and the client device is located within a geographic boundary of the first store of the first merchant.

20. A non-transitory machine readable medium that stores instructions that, when executed by a machine, cause the machine to:
   receive, by a cross selling system, merchant criteria from a merchant system, the merchant criteria identifying product listings to be excluded from related products listings for the merchant;
   receive, by the cross selling system from a client device, a request for a product listing, the request for the product listing including product information corresponding to an in-store product located at a store of the merchant, the request being based at least on a determination that the client device scanned the in-store product at the store of the merchant;
   identify a related product listing from a stored plurality of product listings based on the included product information of the received request, wherein each product listing of the stored plurality of product listings corresponds to a merchant product associated with the merchant; and
   communicate, to the client device from the cross selling system, a recommendation to purchase the identified related product listing.

21. The method of claim 19, wherein the request for the product listing is received based on a determination that the client device is located within a geographic boundary associated with at least one of the plurality of stores.

* * * * *